United States Patent
Appel et al.

(10) Patent No.: US 11,008,686 B1
(45) Date of Patent: May 18, 2021

(54) SEAM FINISHING SYSTEMS AND METHODS

(71) Applicant: SoftWear Automation Inc., Cumming, GA (US)

(72) Inventors: D. Keith Appel, Atlanta, GA (US); Michael J. Baker, Acworth, GA (US)

(73) Assignee: SoftWear Automation, Inc., Cumming, GA (US)

( * ) Notice: Subject to any disclaimer, the term of this patent is extended or adjusted under 35 U.S.C. 154(b) by 0 days.

(21) Appl. No.: 16/889,280

(22) Filed: Jun. 1, 2020

(51) Int. Cl.
*D05B 19/16* (2006.01)
*D05B 91/06* (2006.01)
*D05B 37/04* (2006.01)
*B25J 15/00* (2006.01)

(52) U.S. Cl.
CPC .......... *D05B 19/16* (2013.01); *B25J 15/0019* (2013.01); *D05B 37/04* (2013.01); *D05B 91/06* (2013.01)

(58) Field of Classification Search
CPC .......... D05B 1/06; D05B 61/00; D05B 37/04; D05B 19/06; D05B 19/16; B25J 15/0019
See application file for complete search history.

(56) References Cited

U.S. PATENT DOCUMENTS

| | | | | |
|---|---|---|---|---|
| 4,917,051 A | * | 4/1990 | Small | D05B 23/00 112/171 |
| 5,799,599 A | * | 9/1998 | Tsukioka | D05B 3/14 112/255 |

* cited by examiner

*Primary Examiner* — Nathan E Durham
(74) *Attorney, Agent, or Firm* — Thomas|Horstemeyer, LLP

(57) ABSTRACT

Various examples are provided related to seamer systems and methods that can be used at the end of a sewing process to secure sewing medium in sewn material by creating a knot. Excess sewing medium can be removed after forming knot at the sewn material. A clamp can secure a portion of the sewing medium while allowing at least one element of the sewing medium to pass through the clamp. A material stabilizer can align the sewing medium to form the knot and sever the excess sewing medium after the knot is formed.

20 Claims, 5 Drawing Sheets

SEAM FINISHING SYSTEMS AND METHODS

FIELD OF THE DISCLOSURE

The present disclosure is generally related to the automation of sewing using sewing robots. More specifically, the disclosure is related to manipulation of a material in an automated sewing process to secure the seams of a sewn material.

BACKGROUND

Many types of sewn stitches are susceptible to unraveling if the threads and the end of the stitching are not secured. In manual sewing operations, it is common for the operator to secure the thread ends by creating a knot near the edge of the sewn material. For fully automated processes, it is desirable to include this securing operation to reduce the amount of labor required to finish the sewn product. The value of this disclosure is to provide the ability to secure lose threads at the end of a sewing process such that the threads do not become lose or unravel during transportation or use of the materials.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to automation of sewing using sewing robots. Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
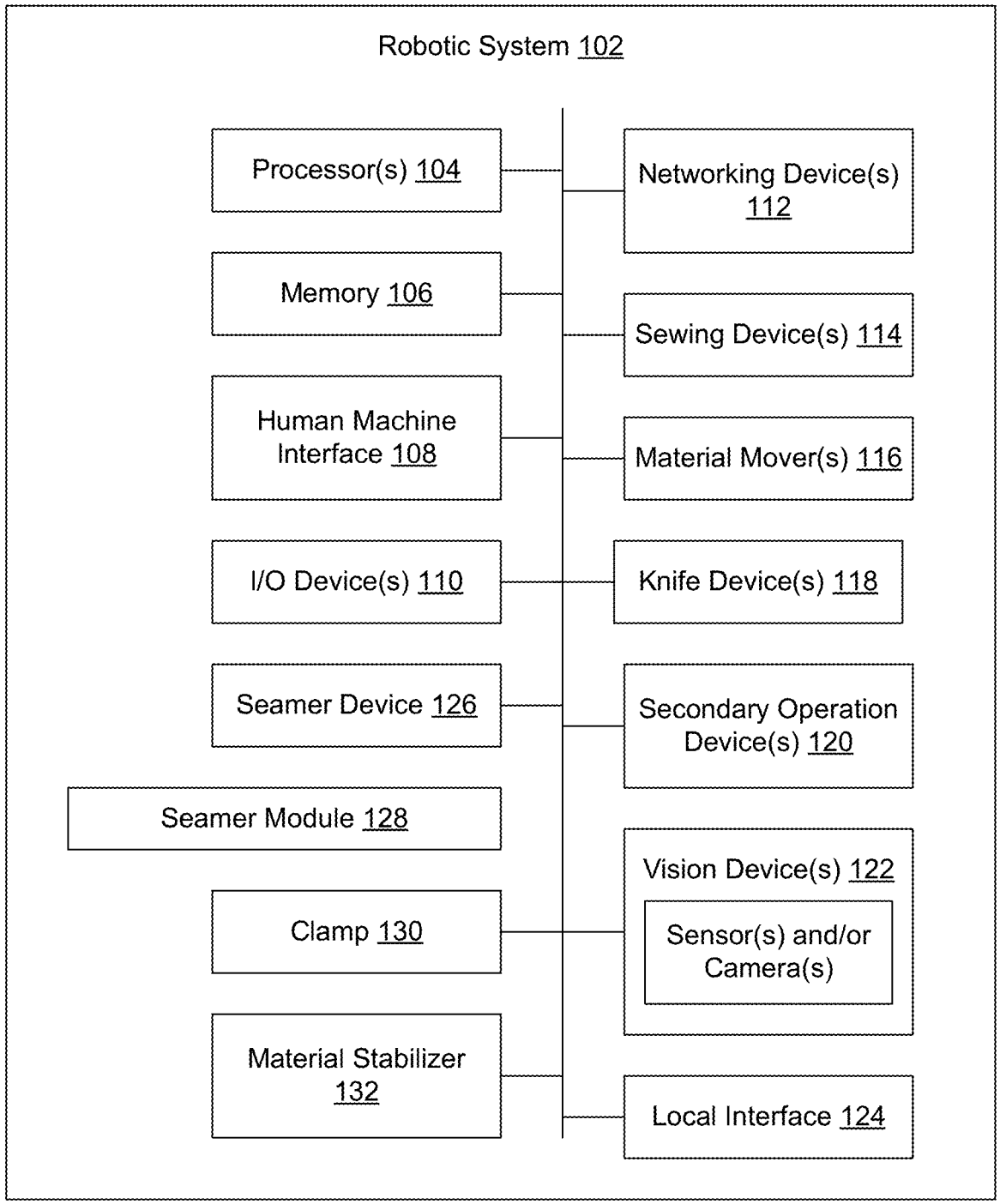
FIG. 1 illustrates an example of a seamer system, according to various embodiments of the present disclosure.

Referring to FIG. 1, shown is an example of a seamer system. As illustrated in the example of FIG. 1, the system can comprise a robotic system 102, which can include a processor 104, memory 106, an interface such as, e.g., a human machine interface (HMI) 108, I/O device(s) 110, networking device(s) 112, a sewing device 114, material (e.g., fabric) mover(s) 116, knife (or cutting) device(s) 118, secondary operation device(s) 120, vision device(s) 122, and a local interface 122. The vision device(s) 120 can comprise a sensor or camera such as, e.g., an RGB camera, an RGB-D camera, a near infrared (NIR) camera, stereoscopic camera, photometric stereo camera (single camera with multiple illumination options), etc. The robotic system 102 can also include a seamer device 126, a seamer module 128, a clamp 130, and a material stabilizer 132, which may be utilized to finish the processing of the sewn materials.

The robotic system 102 can move a piece of product across a surface of a worktable (or workspace) as the product material is sewn by the sewing device 114 with a sewing medium (e.g., thread(s), monofilament(s), sewing fiber(s) or other element(s), or combinations thereof). When the sewing is complete, the seamer module 128 can move the sewn product to extend the sewing medium between the sewn product and the sewing device 114 so that it is positioned with respect to the seamer device 126. The seamer module 128 can then extend the material stabilizer 132 to align the sewing medium and lower the clamp 130 to hold the sewing medium in position. The sewing medium can then be cut and removed, by the seamer module 128.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a graphical user interface (GUI), a human machine interface (HMI), a voice interface, or a web-based user-interface, at element 108.

The input/output devices or I/O devices 110 of the robotic system 102 can comprise components used to facilitate connections of the processor 104 to other devices such as, e.g., sewing device 114, material (or fabric) mover(s) 116, a knife device 118, secondary operation device(s) 120 and/or vision device(s) 122 and can, for instance, comprise one or more serial, parallel, small system interface (SCSI), universal serial bus (USB), IEEE 1394 (i.e. Firewire™), or other appropriate connection elements.

The networking device(s) 112 of the robotic system 102 can comprise the various components used to transmit and/or receive data over a network. The networking device (s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The sewing device 114 of the robotic system 102 facilitates sewing the product materials together and can be configured to sew a perimeter, along markings on the product material, or other paths based on tracking a generated pattern. In additional embodiments, the sewing device 114 can include a knife device (e.g., a tail knife or chain cutter) 118 in order to cut sewing medium such as, e.g., threads, stitches, materials from the workpiece etc. The material mover(s) 116, or fabric mover(s), of the robotic system 102 can facilitate moving the product material(s) during the cutting and sewing operations, at element 116. For example, the product material(s) can be positioned using an end effector on, e.g., an industrial robot or other manipulator or appropriate manipulation assembly. Industrial robots include, e.g., articulated robots, selective compliance assembly robots (SCARA), delta robots, and cartesian coordinate robots (e.g., gantry robots or x-y-z robots). Industrial robots can be programmed to carry out repetitive actions with a high degree of accuracy or can exhibit more flexibility by utilizing, e.g., machine vision and machine learning. The secondary operation device(s) 120 can include stacking device(s), folding device(s), label manipulation device(s), and/or other device(s) that assist with the preparation, making and/or finishing of the sewn product.

The knife (or cutting) device 118 can facilitate cutting the sewing medium. The knife device 118 can be, e.g., a thread cutter, shears, hot cutter, etc. In some embodiments, the knife device 118 can be located within the seamer device 126, for example within the material stabilizer 132. In various embodiments, the knife device 118 can be a separate device. The material or sewing medium can be moved to another position to be cut. In some implementations, the seamer device 126 or the material stabilizer 132 may move out of the way to allow the sewing medium to be cut, at 118.

The vision device(s) 122 of the robotic system 102 can facilitate detecting the movement of the product material(s) and inspecting the product material(s) for defects and/or discrepancies during a sewing and cutting operation. Further, the vision device(s) 122 can facilitate detecting markings on the product before cutting or sewing the material. A vision device 122 can comprise sensor(s) and/or camera(s) such as, but is not limited to, an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc., at element 122. The RGB-D camera is a digital camera that can provide color (RGB) and depth information for pixels in an image.

The local interface 124 of the robotic system 102 can be, for example, but not limited to, one or more buses or other wired or wireless connections, as is known in the art. The local interface 124 can have additional elements, which are omitted for simplicity, such as controllers, buffers (caches), drivers, repeaters, and receivers, to enable communications. Further, the local interface 124 can include address, control, and/or data connections to enable appropriate communications among the components, at element 124.

The seamer device 126 can secure loose sewing medium, create a knot, and cut the excess sewing medium using a material stabilizer 132 and clamp 130, at element 126. A seamer module 126 can position the material via the material mover(s) 116 in the workspace of the seamer, activate the material stabilizer 132 and clamp 130 to secure the loose sewing medium, create a knot to secure the sewing medium on the material, and remove the excess sewing medium. The clamp 130 can secure loose sewing medium sewn in the material while allowing at least one of the loose sewing medium to pass through. In some embodiments, the clamp 130 can be positioned or maneuvered in any direction to secure the loose sewing medium and allow at least one thread or strand of the sewing medium to pass through, at element 130.

The material stabilizer 132, which may be located between the material mover(s) 116 and the sewing device 114, can stabilize the material and restrict the movement of the loose sewing medium when the clamp 130 is lowered. In some embodiments, the material mover(s) 116 may perform the function of the material stabilizer 132. The knife device 118 can cut the excess sewing medium on the material. In some embodiments, the material stabilizer 132 may be actuated in a manner that allows tension to be provided to the sewing medium. In other embodiments, the clamp 130 may be actuated in a manner that allows tension to be provided to the sewing medium. In various embodiments, there may be third device, or a plurality of other devices, placed between the clamp 130 and material stabilizer 132 (e.g., a hook) in order to provide tension to the sewing medium.

Functioning of a seamer device 126 will now be discussed with reference to the example of FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2A:
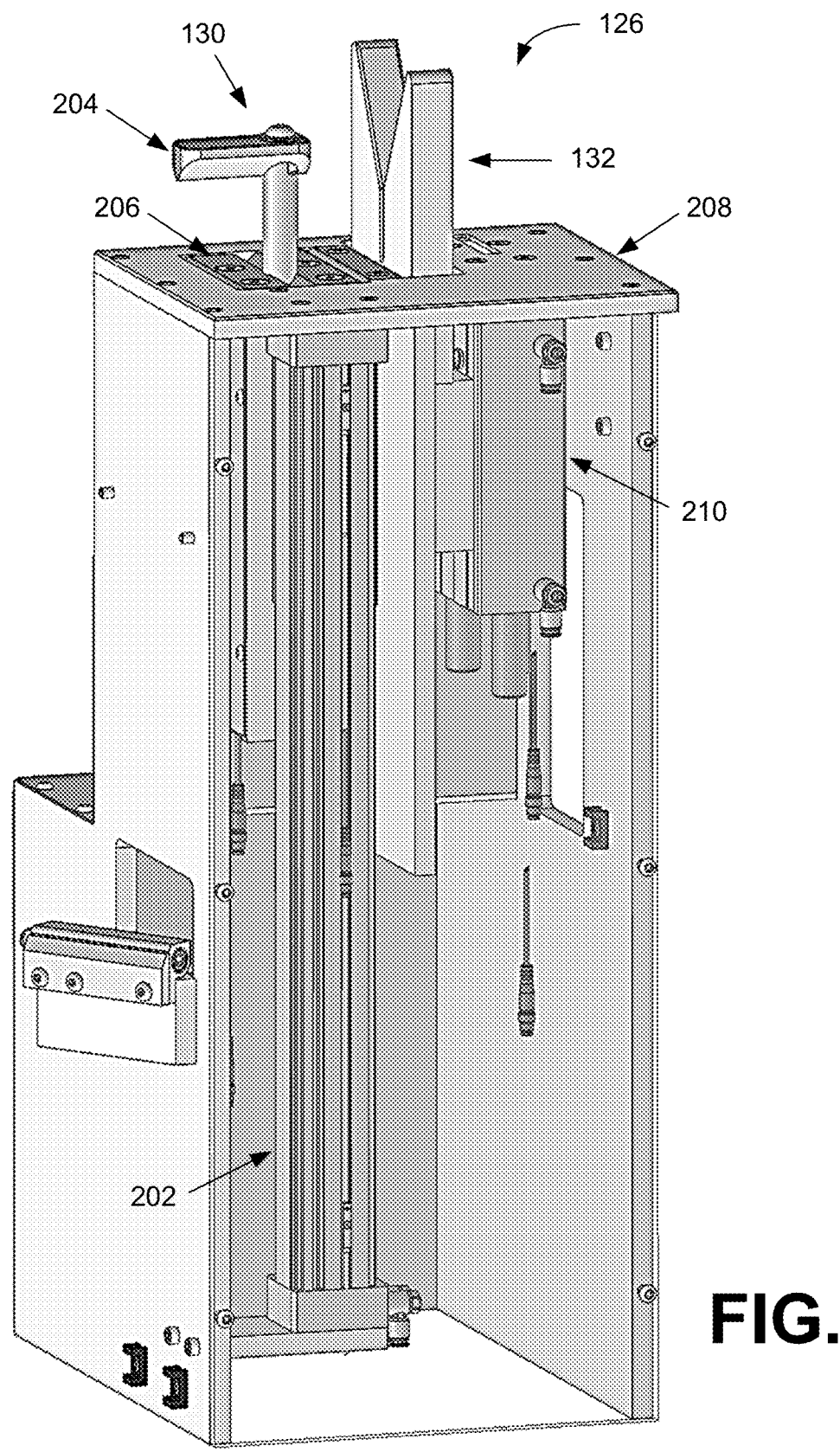
FIGS. 2A and 2B illustrate an example of a seamer device, according to various embodiments of the present disclosure.
Figure 2B:
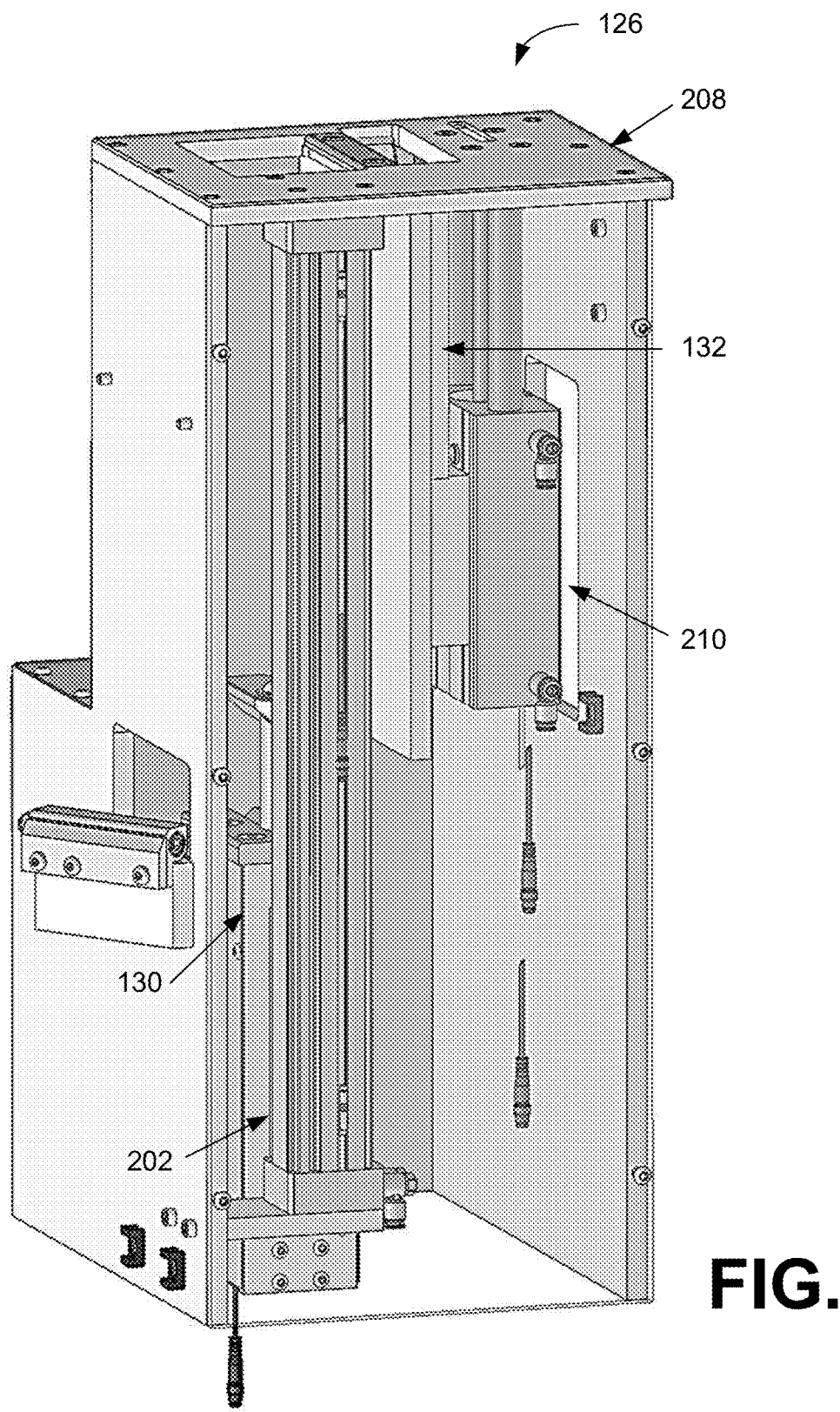

FIGS. 2A and 2B display an example of the seamer device 126, which can secure the loose sewing medium of a sewn material using a material stabilizer 132, a clamp 130, and a clamp retractor 202 in order to create a knot in the sewing medium to secure the sewing medium to the material to prevent it from unraveling. The seamer device 132 can be positioned in close proximity to the sewing device 114 to reduce motion time between the devices. The material stabilizer 132 and the clamp 130 restricts the motion of the material allowing the sewing medium to be tensioned. The clamp retractor 202 provides the tension to the sewing medium needed to create a knot in the sewing medium.

In some embodiments, the sewing medium can be cut after the sewing operation by a knife device 118 (FIG. 1) located at or near the sewing device 114. An end effector or other material mover 116 can be used to position the material and sewing medium appropriately with respect to the seamer device 126. The seamer device 126 allows at least one of the threads or strands of the sewing medium to pass through the clamp 130 in order to pull certain threads or strands to create a knot that will secure the sewing medium to the material.

As shown in FIG. 2A, the material stabilizer 132 can be a concave shaped apparatus comprising a wider opening at a first end that transitions (e.g., tapers or is minimized) to a narrow second end (e.g., a V-shaped region (or other narrowing geometry) with a central grove at the bottom of the V as depicted) that allows the sewing medium to be aligned and supports the material as tension is applied to the sewing medium. A cutting device can be included within the material stabilizer 132 to cut the excess sewing medium. For example, if the sewing medium comprises a combination of yarn and a monofilament, then the material stabilizer 132 can be textured to secure the yarn threads, while the texture allows the monofilament to pass through. Other thread combinations can also be used as the sewing medium in the sewing process to achieve a desired effect. The configuration of the material stabilizer 132 can be adapted for the sewing medium combination of elements.

The space (or central groove) below the concave or V-shaped region of the material stabilizer 132 allows the sewing medium to pass through from the sewn material to the clamp 130 while preventing the sewing medium from moving side-to-side. The material stabilizer 132 can also provide a structure to enhance stability of the material when the clamp 130 is maneuvered to create the knot in the sewing medium. The clamp 130 can comprise a bar 204 that can be lowered down to a platform 206, which can be level with a worktable or workspace 208. The bar of the clamp 130 can secure the loose sewing medium from the sewn material. When lowered, the clamp 130 may allow at least one thread or strand of the sewing medium to pass through the clamp while other thread(s) or strand(s) are retained. This can facilitate tying a knot in the sewing medium.

The bar 204 can have a meshing geometry (e.g., partially or fully meshing) that facilitates securing the sewing medium. For example, the meshing geometry can comprise a convex shape such as, e.g., one or more tapered or curved shape(s) that can interact with the platform 206 to hold the sewing medium for formation of the knot. In some embodiments, the clamp 130 can be textured to allow some threads or strands of the sewing medium to pass through freely while securing other threads or strands of the sewing medium. In another embodiment, particular thread(s) or strand(s) of the sewing medium can be selectively clamped based on their location with respect to the other thread(s) or strand(s) or based on feedback from vision or mechanical sensors. For example, the sewing medium can include at least one yarn and at least one monofilament (e.g., one yarn and one monofilament, one yarn and two monofilaments, two yarns and one monofilament, etc.).

After the clamp 130 secures the sewing medium, the knife device 118 located on or near the sewing device 114 cuts the sewing medium to separate the sewing medium from the sewing device 114. The clamp 130 retracts into the seamer device 126 using the clamp retractor 202 to tension the sewing medium in order to create the knot to secure the sewing medium sewn in the material. The different tensions applied to the different elements of the sewing medium cause them to bind together to form the knot and prevent unraveling. In some implementations, the sewing medium may be cut by the knife device 118 before being retained by the clamp 130. The material can be moved into position after severing the sewing medium and a vacuum or an air jet can be used to align and hold the cut sewing medium in position with respect to the clamp 130 and material stabilizer 132 before forming the knot.

As shown in FIG. 2A, the clamp 130 is extended over the worktable or surface 208. The material can be moved about the work surface 208 around the extended clamp 130 to properly align the sewing medium for finishing. In some implementations, the clamp 130 can be repositioned (e.g., rotated by about 45 degrees, 60 degrees 90 degrees, 180 degrees or other appropriate angle, folded up or down, or linearly shifted) to keep the bar 204 clear of the sewing medium and allow the material to be moved by the material mover(s) 116 without being restricted or hindered by the clamp 130. For example, the material mover(s) 116 can move in an arc to position the material and sewing medium appropriately. In some embodiments, the clamp 130 may be retracted into the platform 206 or the clamp 103 and platform 206 can both be repositioned to provide clearance and avoid movement restriction. The bar and/or platform can be extended or retracted using, e.g., a piston, cylinder, or other linear or rotary actuator, which can be hydraulically, pneumatically or electrically actuated and controlled independently or as a group.

When the sewing medium is appropriately aligned, it can be held in position using the bar 130 and platform 206. The bar can be positioned and lowered into a groove in the platform 206. For example, the bar 204 can be rotated, folded or shifted to align with the groove in the platform 206 before lowering. With the bar 204 in the groove of the platform 206, the clamp retractor 202 can lower the clamp 130 into the seamer device 126 as shown in FIG. 2B. The clamp retractor 202 can be linear actuator such as, e.g., a linear motor, piston or cylinder that can be actuated to retract the clamp 130 below the worktable or surface 208.

As shown in FIG. 2B, the material stabilizer 132 can be retracted into the seamer device 126 by a stabilizer retractor 210 such as, e.g., a linear motor, piston or cylinder that can be actuated, e.g., hydraulically, pneumatically or electrically. As the material stabilizer 132 moves upward through the worktable or surface 208 by the stabilizer retractor 210, the concave or V-shaped region of the material stabilizer 132 guides the sewing medium extending across material stabilizer 132 into a central groove where they can be cut.

Functioning of the seamer module 128 of the robotic system 102 will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
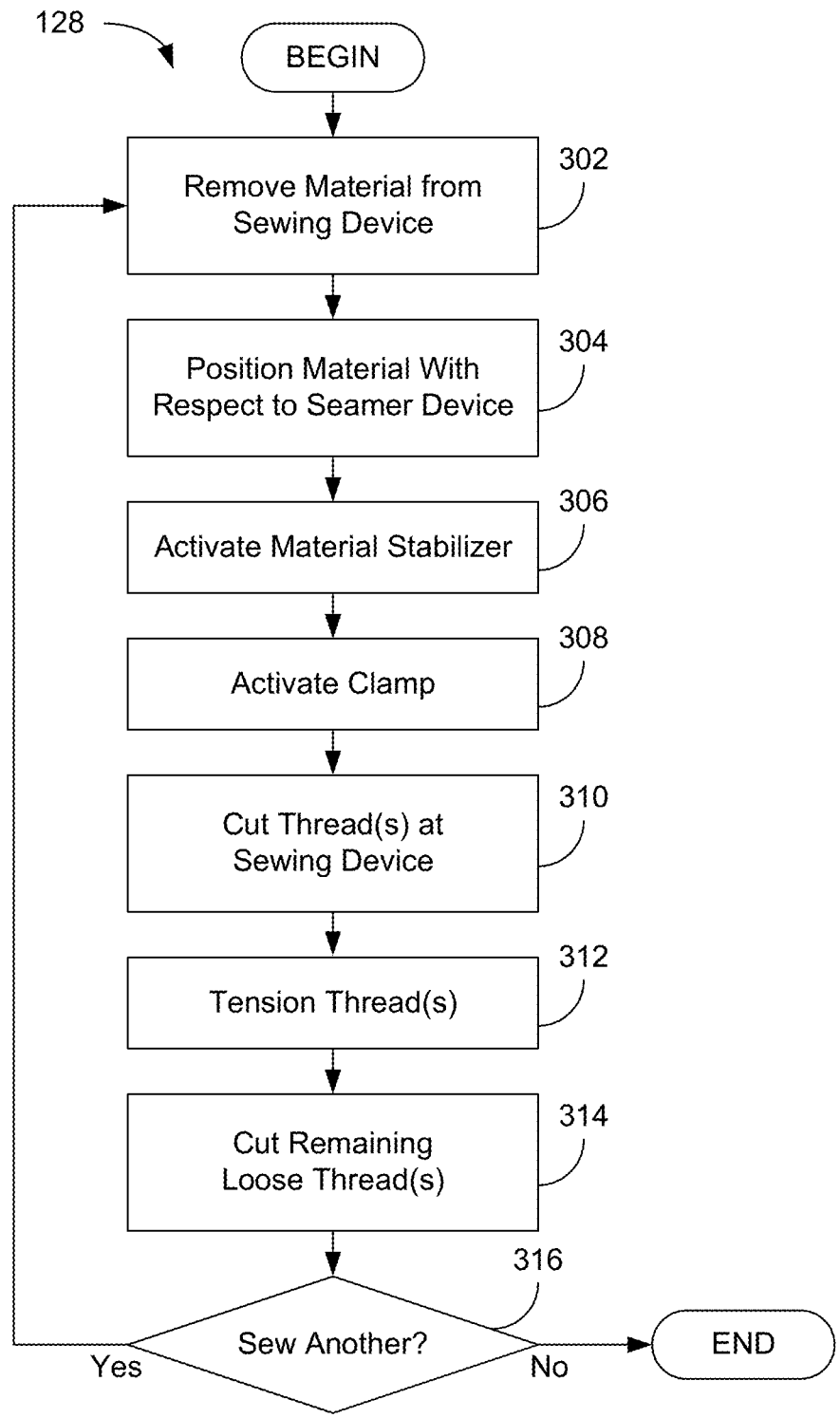
FIG. 3 illustrates an example of a seamer module, according to various embodiments of the present disclosure.

The flow chart of FIG. 3 shows the architecture, functionality, and operation of a possible implementation of the seamer module 128. The process begins at 302 with the material mover(s) 116, for example using an end effector, removing the sewn material from the sewing device 114. The material mover(s) 116 can move the material away from a sew head and needle of the sewing device 114, at 302. Then at 304 the material mover(s) 116 can position the material in the workspace adjacent to the seamer device 126. The seamer device 126 may be positioned near the sewing device 114 so that, when the material mover 116 positions the material, the seamer device 126 is between the material and the sewing device 114, at 304. In this position, the sewing medium between the sewn material and the sewing device 114 can extend across the material stabilizer 132.

Once the material is in the correct position, the material stabilizer 132 can be activated at 306 to extend out of the seamer device 126. The material stabilizer 132 can be raised through the seamer device 126 in order to secure the sewing medium which is still connected to the sewing device at this point. The clamp 130 can then be activated at 308, in which the clamp 130 may be perpendicular to the thread(s) or strand(s) of the sewing medium. The clamp 130 can be lowered to secure the sewing medium while still allowing at least one of the threads or strands of the sewing medium to pass through the clamp 130, at 308, and the sewing medium can be cut at 310 by the knife device 118 between the sewing machine and the clamp 130. In some embodiments, the knife device 118 can be, e.g., a thread cutter, shears, snips, hot cutter, etc.

The clamp 130 can be retracted into the seamer device 126 at 312, pulling the sewing medium through the center groove of the material stabilizer and drawing the sewn material towards the material stabilizer 132 before cutting the sewing medium. A knot can be tied in the sewing medium by pulling the thread(s) or strand(s) of the sewing medium, and any excess sewing medium extending from the knot can be severed by cutting apparatus in the material stabilizer 132. For example, once the knot is created near the sewn material the material stabilizer 132, which can contain the cutting apparatus, cuts the excess sewing medium, and removes the sewing medium from the work area via the clamp 130. In some embodiments, the knife device or cutting apparatus may be a separate device from the material stabilizer 130, at 314. If another product is being sewn at 316, then the flow can return to 302 until the next piece of sewn material is ready for removal from the sewing device 114. Otherwise, the seamer module 128 ends.

Figure 4:
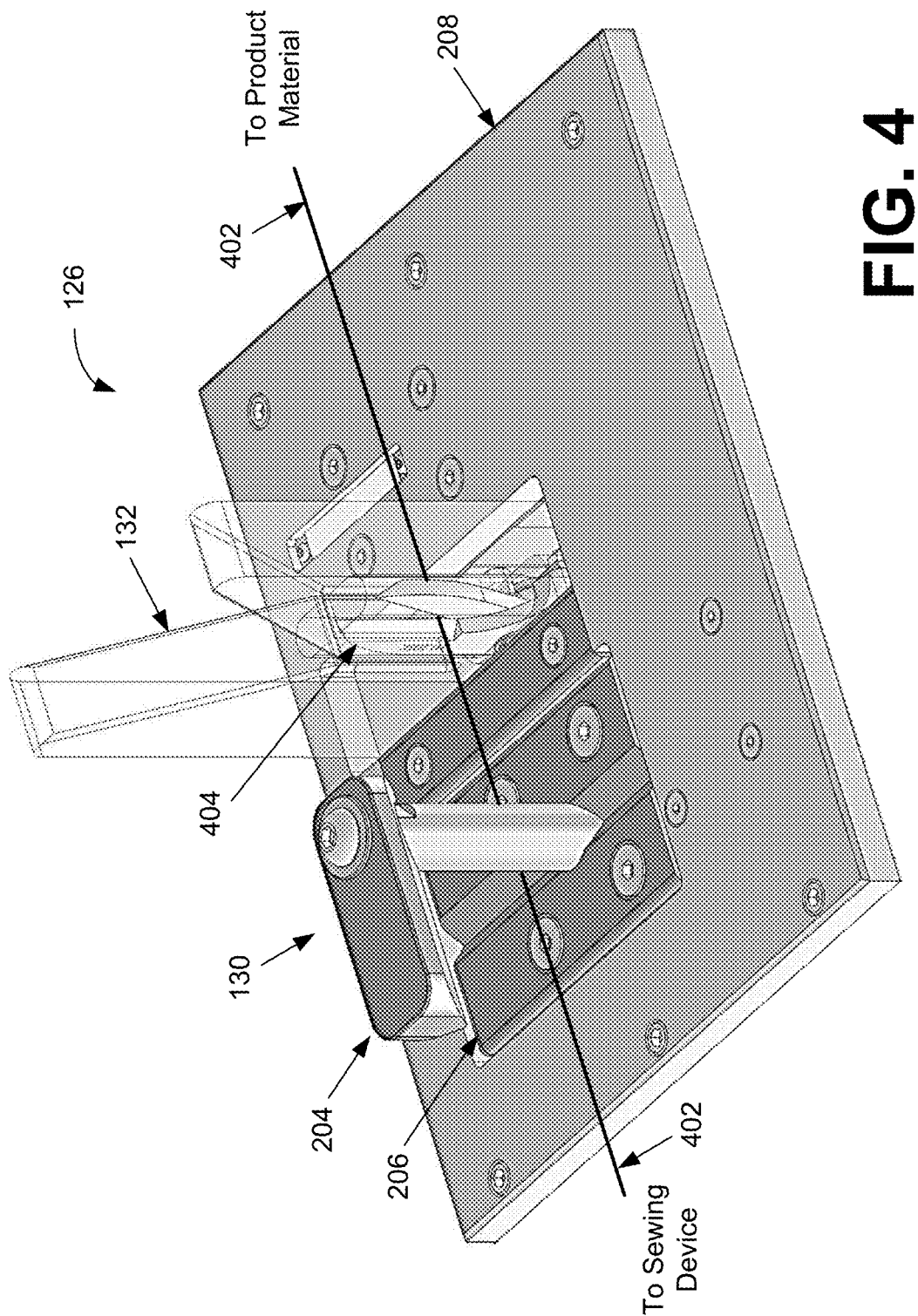
FIG. 4 illustrates an example of a material stabilizer and clamp of the seamer device of FIGS. 2A and 2B, according to various embodiments of the present disclosure.

Referring next to FIG. 4, shown is expanded view of the seamer device 126 illustrating the clamp 130 and material stabilizer 132. Functioning of the seamer device 126 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 4 displays another example of the seamer device 126 of FIGS. 2A-2B. The material stabilizer 132 can be a concave shaped apparatus that allows the sewing medium 402 to be secured in a central groove at the bottom of the concave region (e.g., the V-shaped opening as depicted). As illustrated in FIG. 4, the sewing medium 402 can extend between the sewn material and the sewing device 114 through the central groove of the material stabilizer 132 and across the clamp 130 (shown with the bar 204 in a rotated orientation). The bar 204 of the clamp 130 can be rotated to substantially align with the groove in the platform 206 and lowered to secure the sewing medium 402 in position.

A trimming knife or cutter 404 can be provided within the material stabilizer 132 to cut the excess sewing medium 402. The trimming knife or cutter 404 can be, e.g., a knife, thread cutter, shears, hot cutter, or other appropriate cutting device. FIG. 4 illustrates shears with opposing blades recessed in the material stabilizer 132. The central groove can align the sewing medium 402 over the platform 206 of the clamp 130 and with the trimming knife or cutter 404. The central groove below the concave or V-shaped region of the material stabilizer 132 allows the sewing medium 402 to pass through to the clamp 130 from the material as well as provides a solid structure to enhance stability of the material during knot formation. The material stabilizer 132 can provide support for the material (e.g., a rug) when the clamp retractor 202 pulls down on the sewing medium 402 to create the knot. The trimming knife or cutter 404 in the tension provider can be any type of apparatus that can cut pieces or elements of the sewing medium such as scissors or a sharp edge that provides the separation of the sewing medium 402, as can be understood.

As shown in FIG. 4, the clamp 130 can include a bar 204 that can be lowered down to the platform 206, which is level with the worktable or surface 208. The bar 204 can be rotated (e.g., about 90 degrees) for accessibility and rotated back for lowering to the platform 206. The bar 204 can secure the loose sewing medium 402 from the sewn material while allowing at least one element of the sewing medium 402 to pass through. The bar 204 can include a meshing geometry with, e.g., a tapered or curved lower edge (or other appropriate convex shape) that can align with a groove or slot in the platform 206 to secure the sewing medium 402. The meshing geometry (e.g., partially or fully meshing) can be textured to allow some threads or strands of the sewing medium to pass through freely while securing other threads or strands of the sewing medium. In another embodiment, particular thread(s) or strand(s) of the sewing medium can be selectively clamped based on their location with respect to the other thread(s) or strand(s) or based on feedback from vision or mechanical sensors. For example, the sewing medium can include at least one yarn and at least one monofilament (e.g., one yarn and one monofilament, one yarn and two monofilaments, two yarns and one monofilament, etc.). After the clamp 130 secures the sewing medium 402, a knife device 118 (FIG. 1) can cut the sewing medium 402 to separate it from the sewing device 114.

The clamp 130 can then be moved down into the seamer device 126 by the clamp retractor 202 (as illustrated in FIG. 2B) to pull the sewing medium 402 down. For example, this movement can pull the piece of sewn material against the material stabilizer 132. Movement of the clamp 130 can pull some of the sewing medium 402 while allowing at least one element of the sewing medium (e.g., a monofilament) to pass through the clamp. The pulled sewing medium can bind with the sewing medium element that is allowed to pass through the clamp 130 to form a knot on or near the edge of the material and secure the sewing medium 402 in place. In some implementations, the material mover(s) 116 can hold the material in place while the knot is formed. The clamp platform 206 is the opposing piece that the bar 204 of the clamp 130 closes against. While the bar 204 and the platform 206 are in contact with one another, with the sewing medium 402 secured, they can be lowered into the seamer device 126 with the clamp retractor 202 in order to provide tension on the sewing medium near the material thereby creating the knot and securing the sewing medium 402. When the knot is secured, the trimming knife or cutter 404 can sever the remaining length of the sewing medium 402 from the sewn material. The material stabilizer 132 can then be retracted by the stabilizer retractor 210. The material mover(s) 116 can move the finished material out of the work area 208 and begin processing of the next piece of product.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A robotic system, comprising:
   a seamer device comprising:
     a material stabilizer; and
     a clamp;
   a seamer module; and
   processing circuitry comprising a processor, wherein execution of the seamer module by the processing circuitry causes the robotic system to:
     reposition, by at least one material mover, material sewn by a sewing device on a work surface, the material positioned to extend sewing medium attached to the sewing device and the material across the seamer device;
     extend the material stabilizer to align the sewing medium across the clamp;
     hold the sewing medium in the clamp, wherein the clamp comprises a bar having a meshing geometry that secures a portion of the sewing medium by retracting against a platform of the clamp while allowing at least one element of the sewing medium to slip through the clamp;
     sever the sewing medium between the clamp and the sewing device;
     form a knot in the sewing medium attached to the material by retracting the clamp holding the sewing medium; and
     sever the sewing medium between the clamp and the knot formed in the sewing medium.

2. The robotic system of claim 1, wherein the bar retracts into a groove in the platform.

3. The robotic system of claim 2, wherein the bar rotates to align with the groove prior to retracting.

4. A robotic system, comprising:
   a seamer device comprising:
     a material stabilizer; and
     a clamp;
   a seamer module; and
   processing circuitry comprising a processor, wherein execution of the seamer module by the processing circuitry causes the robotic system to:
     reposition, by at least one material mover, material sewn by a sewing device on a work surface, the material positioned to extend sewing medium attached to the sewing device and the material across the seamer device;
     extend the material stabilizer to align the sewing medium across the clamp;
     hold the sewing medium in the clamp;
     sever the sewing medium between the clamp and the sewing device;
     form a knot in the sewing medium attached to the material by retracting the clamp holding the sewing medium; and
     sever the sewing medium between the clamp and the knot formed in the sewing medium, wherein the material stabilizer comprises a cutting apparatus that severs the sewing medium between the clamp and the knot.

5. The robotic system of claim 4, wherein the cutting apparatus comprises shears with opposing blades.

6. A robotic system, comprising:
   a seamer device comprising:
     a material stabilizer; and
     a clamp;
   a seamer module; and
   processing circuitry comprising a processor, wherein execution of the seamer module by the processing circuitry causes the robotic system to:
     reposition, by at least one material mover, material sewn by a sewing device on a work surface, the material positioned to extend sewing medium attached to the sewing device and the material across the seamer device;
     extend the material stabilizer to align the sewing medium across the clamp, wherein the material stabilizer comprises a concave shaped opening that guides the sewing medium to a central groove that aligns the sewing medium across the clamp;
     hold the sewing medium in the clamp;

sever the sewing medium between the clamp and the sewing device; and form a knot in the sewing medium attached to the material by retracting the clamp holding the sewing medium.

7. A robotic system, comprising:
a seamer device comprising:
a material stabilizer; and
a clamp;
a seamer module; and
processing circuitry comprising a processor, wherein execution of the seamer module by the processing circuitry causes the robotic system to:
reposition, by at least one material mover, material sewn by a sewing device on a work surface, the material positioned to extend sewing medium attached to the sewing device and the material across the seamer device, wherein the at least one material mover comprises an end effector coupled to an industrial robot;
extend the material stabilizer to align the sewing medium across the clamp;
hold the sewing medium in the clamp;
sever the sewing medium between the clamp and the sewing device; and
form a knot in the sewing medium attached to the material by retracting the clamp holding the sewing medium.

8. The robotic system of claim 7, wherein execution of the seamer module causes the robotic system to sever the sewing medium between the clamp and the knot formed in the sewing medium.

9. The robotic system of claim 8, wherein the sewing device comprises a knife that severs the sewing medium between the clamp and the knot adjacent to the sewing device.

10. The robotic system of claim 8, wherein the clamp secures a portion of the sewing medium while allowing at least one element of the sewing medium to slip through the clamp.

11. The robotic system of claim 10, wherein the portion of the sewing medium binds with the at least one element of the sewing medium as the clamp is retracted thereby forming the knot.

12. The robotic system of claim 10, wherein the portion of the sewing medium comprises at least one yarn and the at least one element of the sewing medium comprises at least one monofilament.

13. A robotic system, comprising:
a seamer device comprising:
a material stabilizer; and
a clamp;
a seamer module; and
processing circuitry comprising a processor, wherein execution of the seamer module by the processing circuitry causes the robotic system to:
reposition, by at least one material mover, material sewn by a sewing device on a work surface, the material positioned to extend sewing medium attached to the sewing device and the material across the seamer device;
extend the material stabilizer to align the sewing medium across the clamp, wherein the material stabilizer extends through the work surface adjacent to the clamp;
hold the sewing medium in the clamp;
sever the sewing medium between the clamp and the sewing device;
form a knot in the sewing medium attached to the material by retracting the clamp holding the sewing medium; and
sever the sewing medium between the clamp and the knot formed in the sewing medium.

14. The robotic system of claim 13, comprising a stabilizer retractor configured to extend the material stabilizer after repositioning of the material on the work surface and retract the material stabilizer after severing the sewing medium.

15. The robotic system of claim 13, wherein the clamp secures a portion of the sewing medium while allowing at least one element of the sewing medium to slip through the clamp.

16. The robotic system of claim 15, wherein the portion of the sewing medium binds with the at least one element of the sewing medium as the clamp is retracted thereby forming the knot.

17. A robotic system, comprising:
a seamer device comprising:
a material stabilizer; and
a clamp;
a clamp retractors;
a seamer module; and
processing circuitry comprising a processor, wherein execution of the seamer module by the processing circuitry causes the robotic system to:
reposition, by at least one material mover, material sewn by a sewing device on a work surface, the clamp retractor configured to extend the clamp prior to repositioning the material and the material positioned to extend sewing medium attached to the sewing device and the material across the seamer device;
extend the material stabilizer to align the sewing medium across the clamp;
hold the sewing medium in the clamp, wherein the clamp secures a portion of the sewing medium while allowing at least one element of the sewing medium to slip through the clamp, the clamp retractor configured to retract the clamp holding the sewing medium below the work surface after securing the portion of the sewing medium;
sever the sewing medium between the clamp and the sewing device;
form a knot in the sewing medium attached to the material by retracting the clamp holding the sewing medium; and
sever the sewing medium between the clamp and the knot formed in the sewing medium.

18. The robotic system of claim 17, wherein the clamp is linearly retracted below the work surface.

19. The robotic system of claim 17, wherein the clamp secures a portion of the sewing medium while allowing at least one element of the sewing medium to slip through the clamp.

20. The robotic system of claim 19, wherein the portion of the sewing medium binds with the at least one element of the sewing medium as the clamp is retracted thereby forming the knot.

* * * * *